United States Patent
Bono et al.

(10) Patent No.: US 10,853,320 B1
(45) Date of Patent: Dec. 1, 2020

(54) SCAVENGING DIRECTORIES FOR FREE SPACE

(71) Applicant: EMC IP Holding Company LLC, Hopkinton, MA (US)

(72) Inventors: Jean-Pierre Bono, Westborough, MA (US); Michael D. Schouten, Lake Katrine, NY (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 223 days.

(21) Appl. No.: 15/282,383

(22) Filed: Sep. 30, 2016

(51) Int. Cl.
*G06F 16/17* (2019.01)
*G06F 16/13* (2019.01)
*G06F 16/215* (2019.01)
*G06F 16/2455* (2019.01)

(52) U.S. Cl.
CPC .......... *G06F 16/1727* (2019.01); *G06F 16/13* (2019.01); *G06F 16/137* (2019.01); *G06F 16/215* (2019.01); *G06F 16/24562* (2019.01)

(58) Field of Classification Search
CPC ......... G06F 17/30138; G06F 17/30303; G06F 17/30097; G06F 17/30091; G06F 17/30504; G06F 16/1727; G06F 16/24562; G06F 16/137; G06F 16/13; G06F 16/215
See application file for complete search history.

(56) References Cited

U.S. PATENT DOCUMENTS

| | | | |
|---|---|---|---|
| 7,873,700 B2 | 1/2011 | Pawlowski et al. | |
| 8,086,652 B1 * | 12/2011 | Bisson | G06F 3/0608 707/823 |
| 8,255,550 B1 | 8/2012 | Becher et al. | |
| 8,549,582 B1 | 10/2013 | Andrews et al. | |
| 8,615,500 B1 * | 12/2013 | Armangau | G06F 17/30156 382/232 |
| 9,020,977 B1 | 4/2015 | Schouten | |
| 9,430,492 B1 * | 8/2016 | Bono | G06F 17/30221 |
| 10,007,671 B1 * | 6/2018 | Bono | G06F 17/30088 |
| 2003/0028761 A1 * | 2/2003 | Platt | G06F 11/1417 713/150 |
| 2007/0038697 A1 | 2/2007 | Zimran et al. | |
| 2007/0088702 A1 | 4/2007 | Fridella et al. | |
| 2010/0257218 A1 | 10/2010 | Vassilev et al. | |

(Continued)

OTHER PUBLICATIONS

Sabharwal, Ashish, "CSE 326: Data Structures, Topic #10: Data Hashing (3)," MS Powerpoint presentation, Autumn 2003, 2 slides.

(Continued)

*Primary Examiner* — Tarek Chbouki
*Assistant Examiner* — Maher N Algibhah
(74) *Attorney, Agent, or Firm* — BainwoodHuang

(57) ABSTRACT

A technique for managing storage of directories in a file system performs a testing operation on a file-system block of a directory file. The testing operation determines whether the file-system block contains any directory element that identifies a currently-present content object in the directory. In response to the testing operation determining that the file-system block contains no directory element that identifies any currently-present content object, the file system performs a hole-punching operation on the file-system block, removing the block from the directory file and freeing the block for other use.

17 Claims, 8 Drawing Sheets

(56) References Cited

U.S. PATENT DOCUMENTS

| | | | |
|---|---|---|---|
| 2011/0219106 A1* | 9/2011 | Wright | G06F 15/173 |
| | | | 709/223 |
| 2012/0084333 A1* | 4/2012 | Huang | H04L 29/0854 |
| | | | 707/827 |
| 2017/0337212 A1* | 11/2017 | Hayasaka | G06F 3/061 |

OTHER PUBLICATIONS

Elmasri, et al., "Fundamentals of Database Systems," 5th edition, MS Powerpoint presentation, 2007, 38 slides.

* cited by examiner

SCAVENGING DIRECTORIES FOR FREE SPACE

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

File systems are data objects that data storage systems commonly manage on behalf of hosts. For example, a data storage system may store one or more file systems that are made accessible to hosts over a network, e.g., for reading, writing, and so forth.

As is known, "directories" are structures that help to organize content objects in a file system, such as files, subdirectories, links, and so forth. Each directory provides a list of entries for content objects that belong to that directory. In some examples, directories are implemented in the form of files, which may be referred to as "metadata files" or "metafiles." Like other files, directory files have per-file metadata, such as inodes (index nodes). They also have file data. The file data of a directory stores a list of directory entries for content objects that belong to that directory, as well as a way to locate each content object, e.g., by mode number. The actual content objects in the directory are stored elsewhere, such as in their own respective files.

SUMMARY

Many directories are small, as they may organize only a small number of files or other content objects. Increasingly, however, very large directories are becoming more common, with some directories containing thousands or even millions of files or other objects. When directories become very large, so too do the files used to implement them, as directory files listing thousands or millions of objects are themselves very large files.

When a file system removes files or other content objects from a directory (e.g., by executing one or more delete or move commands), the file system deletes or invalidates directory entries for those content objects. Unfortunately, however, the file system does not reclaim the storage space used to support the removed directory entries. For example, removing 99% of the directory entries from a 100 MB directory file effects no change in the directory file's storage footprint. The directory file continues to consume 100 MB of storage space even though it requires only about 1 MB to support its active entries. As a result, the file system utilizes its storage space for directories less efficiently than is possible. Also, when file systems back their directories with flash drives, failure to reclaim unused storage space from directories can result in increased wear on those flash drives, as opportunities are lost for the flash drives to better organize their contents.

In contrast with the prior approach, an improved technique for managing storage of directories in a file system performs a testing operation on a file-system block of a directory file. The testing operation determines whether the file-system block contains any directory element that identifies a currently-present content object in the directory. In response to the testing operation determining that the file-system block contains no directory element that identifies any currently-present content object, the file system performs a hole-punching operation on the file-system block, removing the block from the directory file and freeing the block for other use.

Advantageously, the hole-punching operation frees storage space that backs the file-system block, such that the storage footprint of the directory file is reduced. When repeated over many file-system blocks, substantial improvements in storage utilization can be achieved. For instance, in the example given above, the improved technique may reclaim approximately 99% of the storage space backing the directory file, thus enabling the backing storage to be used elsewhere by the file system and/or helping to prevent wear in flash drives.

In some examples, the testing and hole-punching operations are performed inline with file system requests to remove content objects from a directory, such as delete or move requests. In other examples, the testing and hole-punching operations are performed in the background, e.g., in response to detecting that directory scavenging is likely to be profitable, based, for example, on a set of heuristics.

Certain embodiments are directed to a method of managing storage of directories in a file system. The method includes implementing a directory as a file in the file system. The file has metadata that stores an ordered list of block pointers, at least some of the block pointers pointing to file-system blocks that store directory elements that identify content objects in the directory. After removing some of the content objects from the directory, the method further includes performing a testing operation to determine whether a file-system block pointed to by a block pointer of the file contains any directory element that identifies a currently-present content object in the directory. In response to the testing operation determining that the pointed-to file-system block does not contain any directory element that identifies a currently-present content object in the directory, the method further includes performing a hole-punching operation by (i) updating the block pointer so that it no longer points to the file-system block and (ii) freeing the file-system block so that it is no longer used by the file.

Other embodiments are directed to a data storage system constructed and arranged to perform a method of managing storage of directories in a file system, such as the method described above. Still other embodiments are directed to a computer program product. The computer program product stores instructions which, when executed on control circuitry of a data storage system, cause the data storage system to perform a method of managing storage of directories in a file system, such as the method described above.

The foregoing summary is presented for illustrative purposes to assist the reader in readily grasping example features presented herein; however, it is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing storage of directories in a file system performs a testing operation on a file-system block of a directory file. The testing operation determines whether the file-system block contains any directory element that identifies a currently-present content object in the directory. If no content objects are currently found in the file-system block, the file system performs a hole-punching operation on the file-system block, removing the block from the directory file and freeing the block for other use. Advantageously, the hole-punching operation frees storage space that backs the file-system block, such that the storage footprint of the directory file is reduced.

Figure 1:
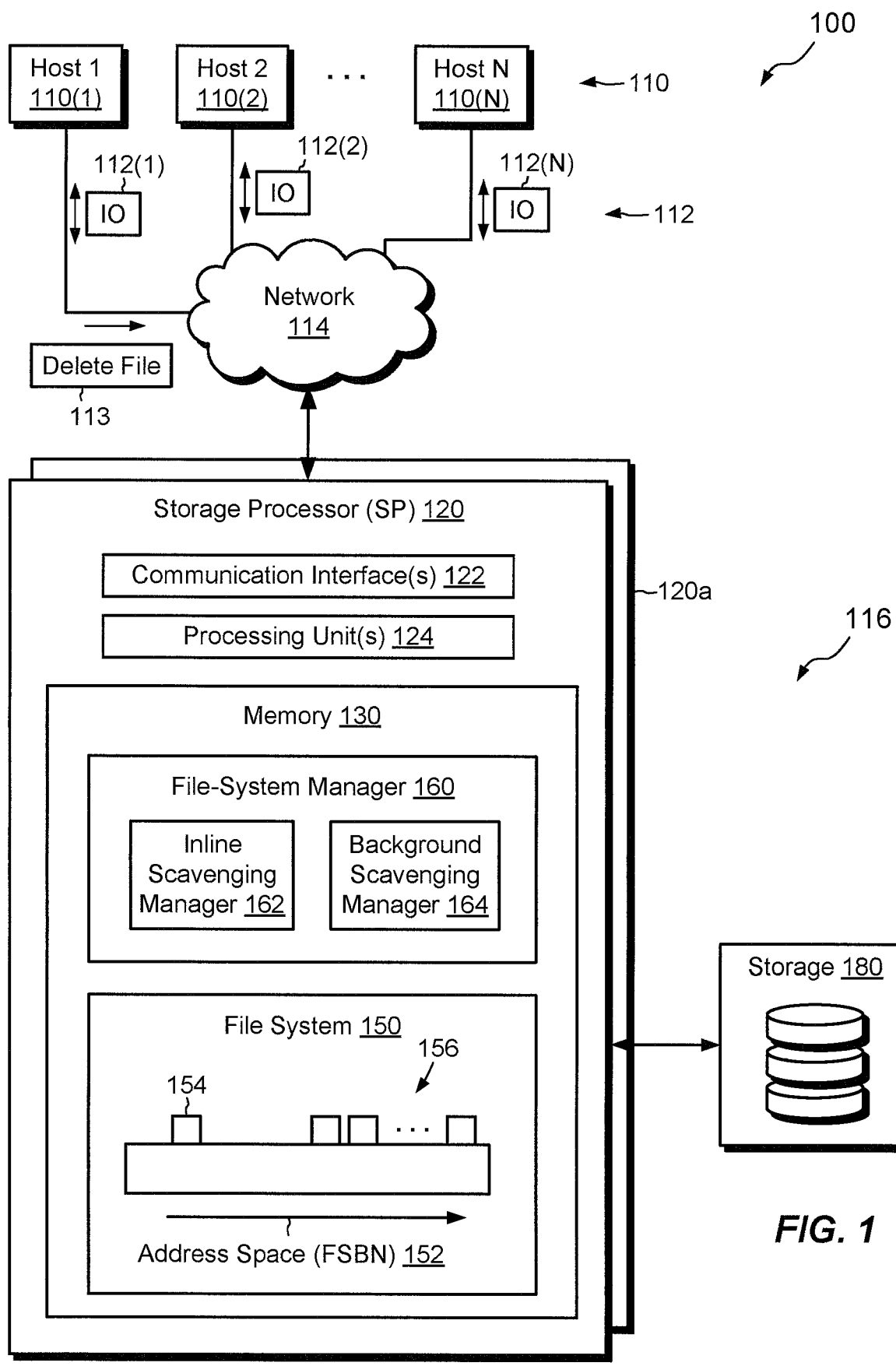
FIG. 1 is a block diagram showing an example environment in which embodiments of the technique hereof may be practiced.

FIG. 1 shows an example environment 100 in which embodiments of the improved technique hereof can be practiced. Here, multiple host computing devices ("hosts") 110 (i.e., 110(1) through 110(N)) access a data storage system 116 over a network 114. The data storage system 116 includes a storage processor, or "SP," 120 and storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a local area network (LAN), a wide area network (WAN), the Internet, and/or some other type of network or combination of networks, for example. The hosts 110 may connect to the SP 120 using various file-based protocols, such as NFS and CIFS, for example. Any number of hosts 110 may be provided, using any of the above protocols, some subset thereof, or other protocols besides those shown. The SP 120 is configured to receive IO requests 112 (i.e., 112(1) through 112(N)) according to file-based protocols and to respond to such IO requests 112 by reading or writing the storage 180.

The SP 120 is seen to include one or more communication interfaces 122, a set of processing units 124, and memory 130. The communication interfaces 122 include, for example, network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions stored therein, a file system 150 and a file-system manager 160. The file system 150 has a physical address space 152, which ranges, for example, from zero to some large number. In an example, each address in the physical address space 152 corresponds to a respective block of storage, where a "block" is the smallest unit of storage space that the file system may allocate. Block sizes are typically several kilobytes, such as 4 KB or 8 KB, for example, although blocks may be any suitable size. Within blocks in the physical address space 152, the file system 150 stores all data and most if not all metadata needed to realize the file system 150, including all of its files, directories, links, and so forth. Addresses within the physical address space 152 may be identified by File System Block Number, or "FSBN."

In the example shown, the file system 150 stores a directory file 154. The directory file 154 includes, within its file data and metadata, a directory structure, which may be used by hosts 110 to organize content objects, such as other files, sub-directories, links, and so forth. In an example, the directory file 154 includes metadata that provides pointers to file-system blocks in the physical address space 152, which blocks store directory entries and associated structures. Other files 156 are shown. It should be appreciated that the file system 150 may include any number of directory files and files of any other kind.

In some examples, flash drives in storage 180 provide backing storage for directory files, like file 154. Backing directory files with flash enables hosts 110 to quickly access directory entries, i.e., without the usual delays associated with magnetic disks.

As further shown in FIG. 1, the file-system manager 160 includes an inline scavenging manager 162 and a background scavenging manager 164. Both the inline and the background scavenging managers 162 and 164 scavenge directory files for free space. The inline scavenging manager 162 operates in line with file system requests, such as in response to delete and move requests, whereas the background scavenging manager 164 runs in the background, generally out of band with particular file system requests. Some implementations may include only one scavenging manager (i.e., either inline or background), whereas other implementations include both.

In example operation, the hosts 110 issue IO requests 112 to the data storage system 116. The SP 120 receives the IO requests 112 at the communication interfaces 122 and initiates further processing. Such processing may direct the file-system manager 160 to read and write files in the file system 150, or to create, delete, copy, or move new files and/or directories, for example. As the file-system manager 160 adds new content objects to the directory implemented by directory file 154, the file-system manager 160 creates new directory entries that identify the new objects. Creating the new directory entries may necessitate allocating new file-system blocks to the directory file 154, such that the physical storage space used by the directory file 154 grows.

Sometime later, e.g., after the directory file 154 has grown to a large size, a host 110 may issue one or more IO requests 112 to delete certain content objects from the directory. In response, the file-system manager 160 deletes or invalidates the directory entries for those content objects. These acts may leave the directory file 154 larger than it needs to be to support the directory entries that remain.

In accordance with improvements hereof, the file-system manager 160 may invoke the inline scavenging manager 162 when deleting or otherwise removing particular content objects. In an example, for each content object to be removed from the directory, the inline scavenging manager 162 checks the file-system block in which that directory entry is found. For example, the inline scavenging manager 162 performs a testing operation to determine whether the file-system block contains any valid directory entries, i.e., those which identify currently-present content objects in the directory. If the block contains no valid directory entries, the inline scavenging manager 162 may perform a hole-punching operation, in which it removes the file-system block from the directory file 154, such that the file-system block becomes free.

In a similar fashion, the file-system manager 160 may invoke the background scavenging manager 164. In this case, however, scavenging is not performed inline but rather in the background, e.g., in response to system heuristics that indicate that directory scavenging may be profitable. Such background scavenging may iterate over many file-system blocks pointed to by the directory file 154, such as all of the pointed-to blocks or some subset of them, performing the above-described testing operation on each such block and performing the hole-punching operation if the testing operation determines that there are no valid directory entries in the respective blocks.

The file-system manager 160 may employ inline and background scavenging separately or together. If inline scavenging is performed every time a directory entry is removed, there is typically no need ever to perform background scavenging, as all file-system blocks that it would be possible to reclaim have already been reclaimed. However, inline scavenging entails additional overhead processing and may sometimes be prevented, e.g., at times of high demand on the data storage system 116. Background scavenging may thus continue to serve a valuable role in reclaiming blocks that were not reclaimed inline. Also, if background scavenging is performed on a regular basis, there is typically little need for performing inline scavenging.

Using either type of scavenging, the file-system manager 150 may reclaim significant amounts of storage space, which may become available for allocation to other files or directories, and/or may be available for promoting more efficient management of storage resources by flash drives, thereby avoiding premature wear and extending their longevity.

It should be appreciated that performance of the above-described hole-punching operation may be limited by other criteria besides the testing operation in some examples. For instance, some file-system blocks pointed to by the directory file 154 may include directory elements that cannot be removed from the directory file without disrupting the structure of the directory and causing errors. In such examples, the file-system manager 160 may forego performance of the hole-punching operation even if the block in question contains no valid directory entries, as the block is still needed to support the directory's structure.

Figure 2:
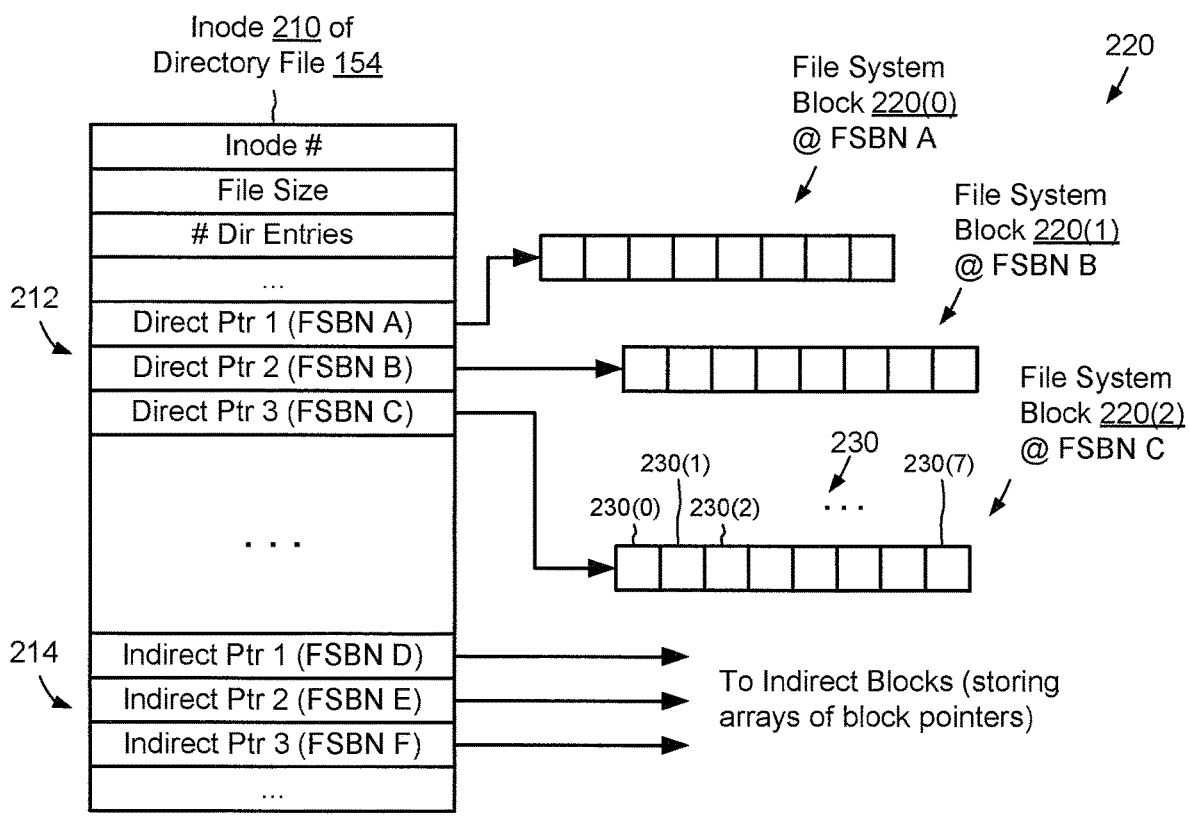
FIG. 2 is a block diagram showing example file metadata of a directory file with block pointers pointing to file-system blocks that each include multiple directory elements.

FIG. 2 shows an example arrangement of metadata for implementing directory file 154. Here, an inode (index node) 210 provides per-file metadata describing directory file 154, such as its inode number ("mode #"), which is unique within file system 150, and file attributes, such as "File Size" (the size of directory file 154) and "# Dir Entries" (the number of directory entries stored in the directory file 154). Inode 210 may include additional attributes. The ones shown are merely examples.

Inode 210 is seen to include block pointers. These include direct pointers 212 (e.g., "Direct Ptr 1," "Direct Ptr 2," "Direct Ptr 3," etc.) and indirect pointers 214 (e.g., "Indirect Ptr 1," "Indirect Ptr 2," "Indirect Ptr 3," etc.). Direct pointers point 212 to data blocks, whereas indirect pointers point to indirect blocks ("IBs"). The IBs store arrays of block pointers that point directly to data blocks or to other IBs, forming a tree in which leaf IBs point to data blocks. Both data blocks and IBs have addresses (FSBNs) within the physical address space 152 in the file system 150.

Inode 210 may include any number of direct pointers 212 and any number of indirect pointers 214. Together, the direct pointers 212 and any block pointers in leaf IBs pointed to by indirect pointers 214 form an ordered list of block pointers, which defines a logical address space of the directory file 154.

In the example shown, each direct pointer 212 stores a physical address of the file-system block to which it points. For example, Direct Ptr 1 stores address FSBN A, which provides the physical address of file-system block 220(0). In a like manner, Direct Ptr 2 stores address FSBN B, which provides the physical address of file-system block 220(1), and Direct Ptr 3 stores address FSBN C, which provides the physical address of file-system block 220(2). Indirect pointers 214 are needed if the directory file 154 becomes large, with each indirect pointer 214 storing the physical address (e.g., FSBN D, E, and F) of the respective pointed-to IB. It should be appreciated that "logical" addresses as described herein refer to locations relative to a file, as ordered by the file's inode and IBs (if the file is large enough to require IBs), whereas "physical" addresses correspond to FSBN's in the file system 150. The direct pointers 212, indirect pointers 214, and IBs provide a structure for mapping logical addresses of file 154 into corresponding physical addresses (FSBNs) of data blocks in the file system 150.

As further shown in FIG. 2, file-system blocks 220(0) to 220(2) are each divided into regions. Eight regions per block are shown, with each region providing a respective directory element 230. For example, block 220(2) includes eight directory elements, 230(0) to 230(7). For a file system having a uniform block size of 8 KB, directory elements 230 are each 1 KB, for example. Because directory elements 230 are arranged in file-system blocks, which each have a logical address in the file 154, each directory element 230 is understood to have a unique logical position in the directory file 154. Logical positions of directory elements 230 may be specified in terms of numbers of 1 KB increments. For example, directory element 230(2) may be identified with a logical position of "18" (starting from zero in block 220(0)).

As the directory file 154 grows, e.g., in response to additions of new content objects, the file-system manager 160 may allocate new file-system blocks 220 to the directory file 154. The file-system manager 160 may lay down new directory elements 230 in the newly allocated blocks 220 and may populate some or all of the new directory elements 230 with new directory entries to support the newly added content objects. If content objects are later removed from the directory, e.g., in response to file system delete or move requests, the file-system manager 160 may delete or invalidate the directory entries supporting the content objects to be removed.

When performing directory scavenging on a particular block, such as block 220(2), the file-system manager 160 checks each and every directory element 230 in that block to confirm that it does not contain any valid directory entries. Only if all directory elements 230(0) to 230(7) are free of directory entries is file-system block 220(2) a candidate for the hole-punching operation. Assuming any and all other criteria are met (e.g., the block 220(2) does not contain directory structure that would result in errors if deleted), the hole-punching operation may proceed.

Figure 3:
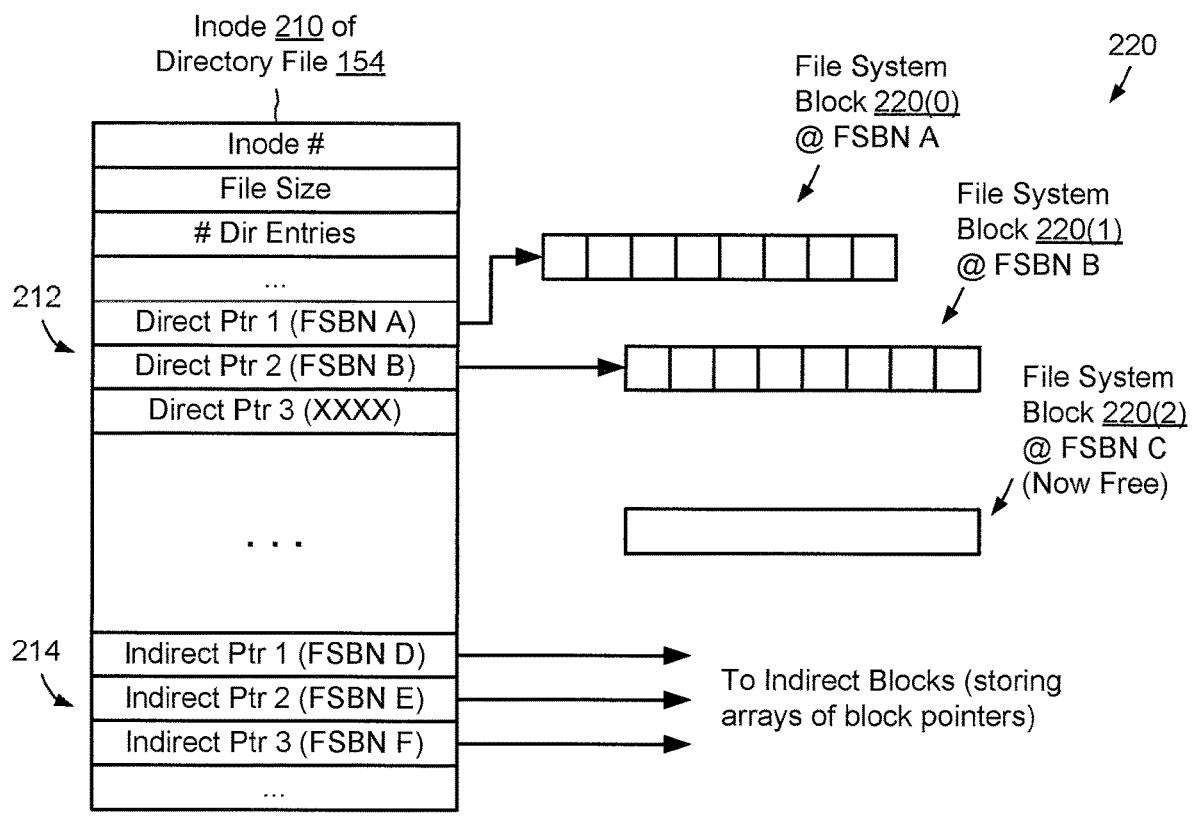
FIG. 3 is a block diagram similar to FIG. 2 but showing a condition after performing a hole-punching operation at a file location of the directory file.

FIG. 3 shows example results of the hole-punching operation. Here, the block pointer Direct Ptr 3 in inode 210 no longer points to the file-system block 220(2) and the file-system block 220(2) is now free. The file-system manager 160 may allocate the block 220(2) for some other purpose, e.g., to another file or directory, or it may keep the block 220(2) as a free block, e.g., to promote flash optimization. As a result of the hole-punching operation, the storage footprint of the directory file 154 is reduced, as it requires one fewer block of backing store.

Figure 4:
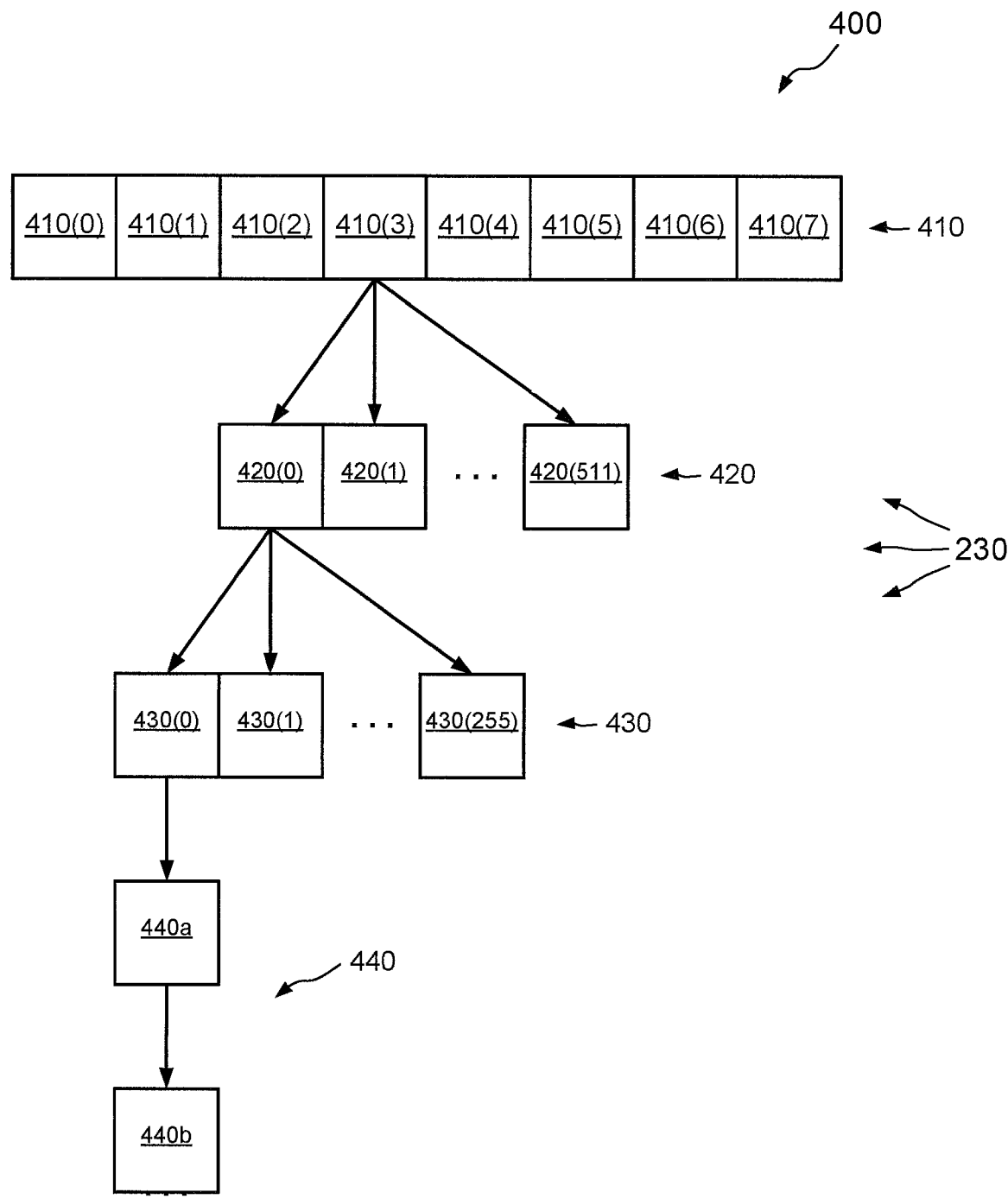
FIG. 4 is a block diagram showing an example organization of a directory stored in the directory file of FIGS. 2 and 3.

FIG. 4 shows an example directory structure 400 with which embodiments of the improved technique hereof can be practiced. It can be seen that the directory 400 is implemented as an extendible hash tree. Further details about directories of this kind may be found in U.S. patent application Ser. No. 13/731,182 filed Dec. 31, 2012, now granted as U.S. Pat. No. 9,020,977, the contents and teachings of which are incorporated herein by reference in their entirety. One should appreciate that the particular directory structure 400 is intended merely as an example and that the invention hereof is not limited to directories of any particular type.

As seen in FIG. 4, the directory 400 includes multiple directory elements 230. In an example, directory elements may be provided in the following three varieties:

Dir-units. Directory elements that store directory entries, which provide information about respective content objects in the directory. Dir-units are addressable by position in directory file 154, as well as by hash value, with each dir-unit covering a range of hash values. The hash range may be written into a header of the dir-unit.

Hash-units. Directory elements that store records that associate ranges of hash values with respective positions in the directory file 154, at which locations other directory elements covering the respective ranges of hash values can be found. Hash-units are addressable by position in directory file 154, as well as by hash value, with each hash-unit covering a range of hash values, which may be written into its header.

Ext-units. Directory elements that provide additional space for storing directory entries once dir-units for a particular hash range are exhausted. Ext-unit are addressable by position in the directory file 154.

In an example, the directory 400 is initially empty of entries but is formatted to contain directory elements 410(1) to 410(7), which may reside within a single file-system block 220 (FIG. 2). These directory elements 410(1) to 410(7) may be referred to as "first-level" directory elements 410, and they are initially provided as dir-units.

As the file-system manager 160 adds content objects to the directory 400, it creates new directory entries for those content objects and stores the directory entries in the dir-units 410. In an example, the file-system manager 160 assigns directory entries to dir-units 410 based on hash values. For instance, the file-system manager 160 computes hash values of names of content objects and uses three bits from the resulting hash values to identify one of the eight dir-units in which to place each respective directory entry. For example, if a file named "MyNotes" were added to directory 400, the file-system manager 160 would compute a hash of "MyNotes," with three bits of the resulting hash value used to identify one of the eight dir-units 410. The file-system manager 160 would then place a directory entry for MyNotes in the matching dir-unit.

Hash-based placement may proceed in this manner as content objects are added, until one of the dir-units becomes full and is unable to store a new directory entry. In this example, it is assumed that dir-unit 410(3) has become full. At this point, the file-system manager 160 converts the dir-unit 410(3) into a hash-unit and obtains two new dir-units (e.g., from a new file-system block 220). As shown in the example, the file-system manager 160 creates new dir-units 420(0) and 420(1). Records are written to the hash-unit at 410(3) to track positions and hash ranges of the new dir-units. The file-system manager 160 may divide the hash range of directory element 410(3) in half (e.g., using another bit of the hash values to distinguish them), and may distribute directory entries between the new dir-units based on their hash ranges. As these "second-level" dir-units 420 continue to fill, they may divide laterally, with up to 512 dir-units created at the second level for each hash block at the first level. The first and second levels may consume a total of twelve bits of the hash value, three for the first level and nine for the second.

If we now assume that second-level dir-unit 420(0) has become full, with no further lateral splits available, file-system manager 160 may convert dir-unit 420(0) into a hash-unit, which is made to point to a new pair of third-level dir-units 430(0) and 430(1). These may in turn divide, providing up to 256 third-level dir-units 430. The first, second, and third levels may together consume a total of 20 bits of the hash value.

If a third-level dir-unit 430 should then become full, ext-units 440 may be added (e.g., 440a and 440b from dir-unit 430(0)). These ext-units 440 serve merely to extend a dir-unit and may be arranged in a linked list. Ext-units 440 consume no additional hash space.

With the arrangement shown, the file-system manager 160 may perform lookups of any named content object in the directory 400 by hashing the name and applying the bits of the resulting hash value as an address into the extendable hash tree to identify the dir-unit containing the directory entry. If the directory entry is stored in an ext-unit, the linked list may be followed from the matching dir-unit to the ext-unit containing the entry. The file-system manager 160 may then search the matching dir-unit (or ext-unit) for the particular directory entry.

Figure 5:
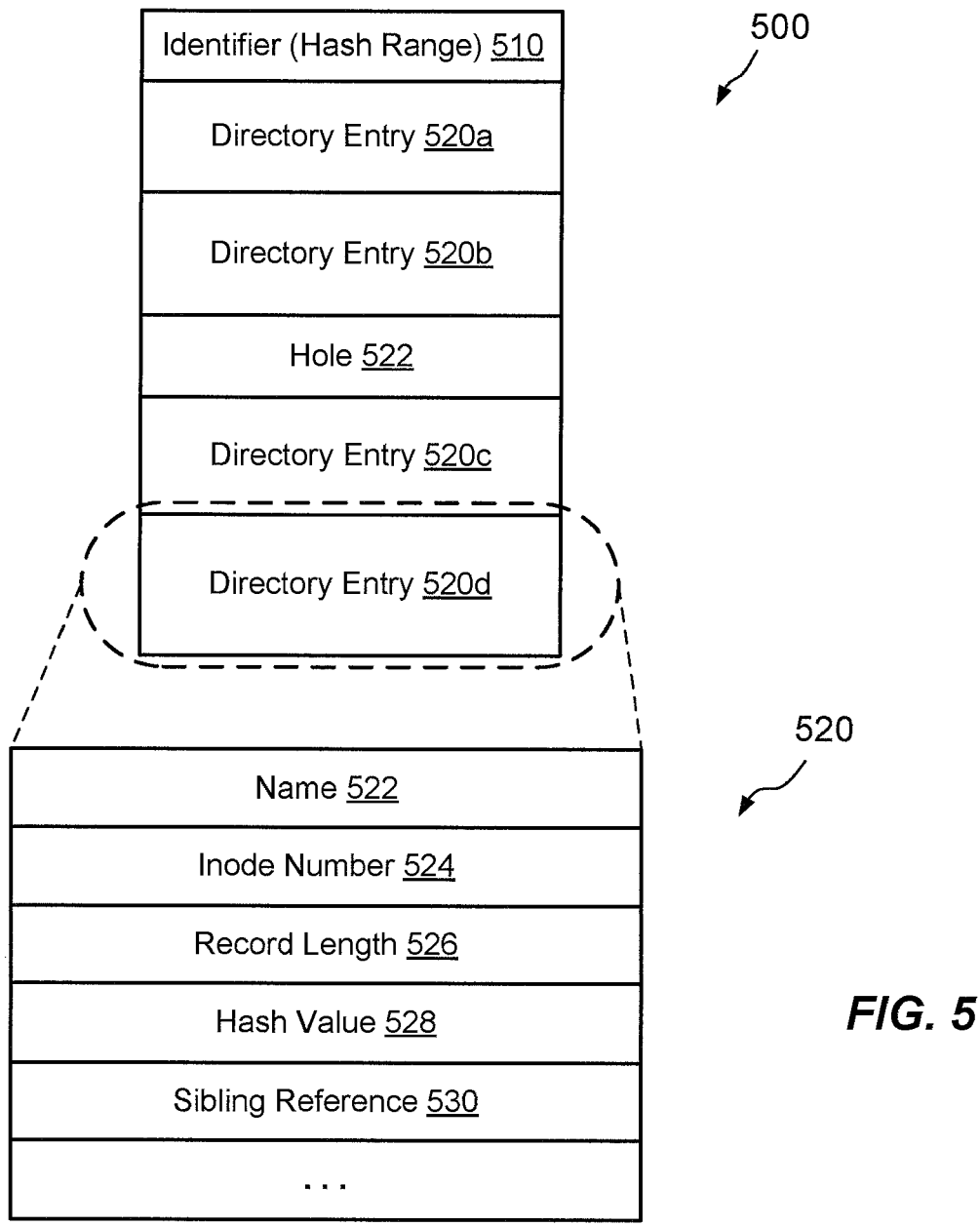
FIG. 5 is a block diagram showing an example directory element provided in the form of a dir-unit, where the dir-unit is seen to include multiple directory entries.

FIG. 5 shows an example dir-unit 500 in greater detail. The dir-unit 500 may be representative of any dir-unit in the directory 400. Here, it is seen that dir-unit 500 includes an identifier 510 that provides a range of hash values covered by that dir-unit. Hash-based lookups of directory entries may access this particular dir-unit if a hash of the name of the searched-for object falls within the range of hash values specified in the identifier 510. The dir-unit 500 further includes directory entries (e.g., 520a, 520b, 520c, and 520d). The dir-unit 500 may also include one or more holes, such as hole 522, where no directory entry is stored.

FIG. 5 also shows an example directory entry 520 in greater detail. The directory entry 520 may be representative of any directory entry in the directory 400. The directory entry may include a name 522 of the content object that the entry describes and the inode number 524 of the content object in the file system 150. The directory entry 520 may also store a record length 526 of the directory entry (e.g., in bytes) and the hash value 528 to which the name 522 hashes. In some examples, the directory entry 520 also stores a sibling reference 530. The sibling reference 530 supports multi-protocol directories and includes a reference to another directory entry in the directory 400 that refers to the same content object by a different name. Different names for a given content object can arise when an original name in one protocol (e.g., Unix) is not allowed in another protocol (e.g., M83). In such cases, each unique name gets its own directory entry. The sibling reference 530 in each directory entry points to another directory entry for the same content object (a "sibling"), with siblings connected to one another, e.g., using a circular linked list.

Figure 6:
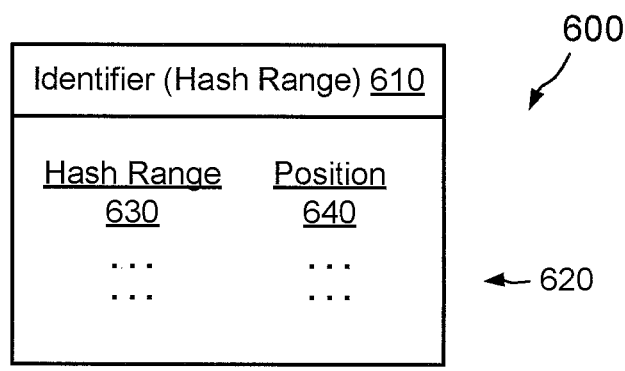
FIG. 6 is a block diagram showing an example directory element provided in the form of a hash-unit, where the hash-unit is seen to include multiple records.

FIG. 6 shows an example hash-unit 600 in greater detail. The hash-unit 600 may be representative of all hash-units in the directory 400. In the manner shown, the hash-unit 600 includes an identifier that provides a range of hash values covered by that hash-unit. Hash-based lookups of directory entries may access this particular hash-unit if a hash of the name of the searched-for object falls within the range of hash values specified in the identifier 610.

The hash-unit 600 further includes records 620 that associate hash ranges 630 with respective logical positions 640 in the directory file 154. The logical positions 640 provide locations of directory elements one level down in the extendible hash tree that cover the corresponding hash range 630.

When practicing embodiments of the invention using the directory structure 400, it is evident that the hole-punching operation described above should preferably be avoided for any file-system block 220 that contains hash-units, as removing a hash-unit may erase address information about directory elements 230 subordinate to that hash-unit in the extendible hash tree. Hole punching should also preferably be avoided for file-system blocks 220 that contain ext-units, as well as for the dir-units from which ext-units extend, as removing such ext-units and extended dir-units could disrupt the ability to locate directory entries 520 in ext-units.

The above preferred limitations on the hole-punching operation may be avoided if one is willing to rebuild portions of directories. Such rebuilding is expected to be resource-intensive and may not be worthwhile, however, especially considering that hash-units and ext-units are generally rare compared with dir-units and may represent only a small fraction of a directory's contents.

Figure 7:
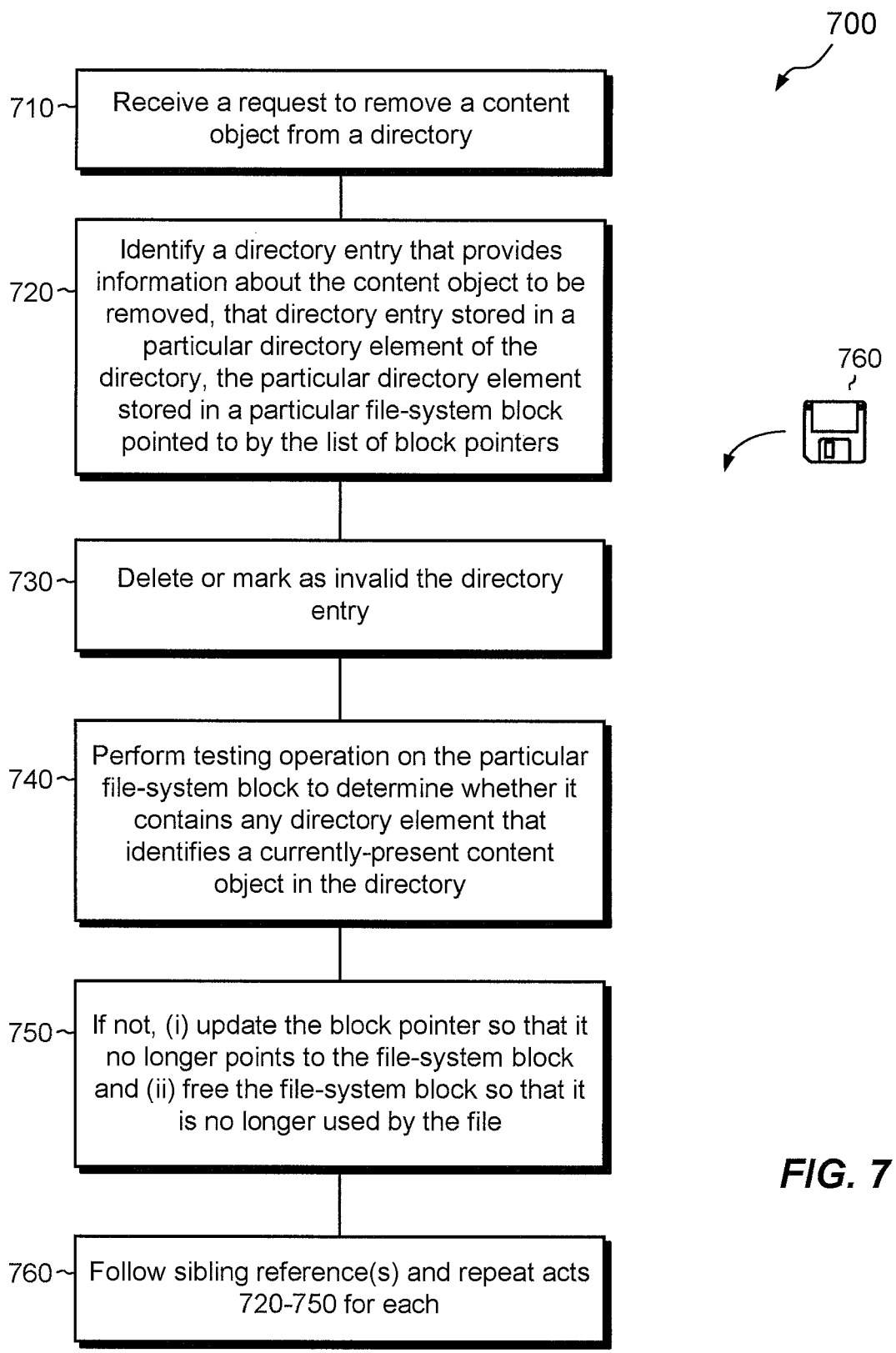
FIG. 7 is a flowchart showing an example method for performing directory scavenging in line with file system requests.

FIG. 7 shows an example method 700 for performing inline directory scavenging. The method 700 may be performed, for example, by the inline scavenging manager 162, which runs within the file-system manager 160 in the memory 130 of SP 120. Although the acts of method 700 are presented in a certain order, the illustrated acts may be performed in orders different from the one shown, and some acts may be performed simultaneously.

At 710, a request is received to remove a content object from a directory. For example, the data storage system 116 may receive a request 113 (FIG. 1) to delete a particular file.

At 720, a directory entry (e.g., 520) is identified that provides information about the content object to be removed. The identified directory entry is stored in a particular directory element 230 of the directory 400, and the particular directory element 230 is stored in a particular file-system block 220 pointed to by the list of block pointers (FIG. 2). For example, file-system manager 160 performs a directory lookup by hashing the name of the file and applying the resulting hash value to traverse the extendible hash tree (FIG. 4). In some examples, the host may have previously received a cookie (e.g., a readdir cookie) that provides the hash value for the particular file (or the logical position in the case of an ext-unit), such that the file-system manager 160 may locate the directory entry more quickly.

At 730, the directory entry of the content object to be removed is deleted or marked as invalid. The directory entry may be deleted in whole or in part, or it may be modified. In a particular example, the directory entry is marked as invalid by changing an attribute, such as the inode number 524, to a particular value, such as zero. The file-system manager 160 may then interpret directory entries as invalid if their inode numbers 524 are zero. The file-system manager 160 may also change the record length 526 of a preceding directory entry, if there is one (such as the one immediately before the entry to be invalidated), such that it reflects the sum of its own record length and the record length of the directory entry currently being marked as invalid.

At 740, a testing operation is performed on the particular file-system block 220 to determine whether it contains any directory element 520 that identifies a currently-present content object in the directory 400. For example, the testing operation is performed by inspecting each directory element 230 in the particular file-system block 220 and confirming that each directory element 230 contains no valid entries. If directory entries 520 are treated as described above when they are invalidated, checking a directory element 530 may be a simple as checking whether its first directory entry 520 has a record length 526 of 1 KB (for example) and has an inode attribute 524 equal to zero. If any valid directory entry 520 is found in any of the directory elements 230 in that block 220, the testing operation fails and no hole-punching operation is performed.

At 750, if the testing operation does not fail, the file-system manager 160 may perform the hole-punching operation on the particular block. As mentioned previously, hole punching may be skipped if any of the directory elements in the file-system block contains a hash-unit, an ext-unit, or a dir-unit that points to an ext-unit.

At 760, the file-system manager 160 checks the sibling reference 530 in the directory entry 520 being deleted or invalidated. If a valid sibling reference 530 is found, the file-system manager 160 follows the sibling reference 530 to another directory entry 520 for the sibling and may delete or invalidate the sibling directory entry as well. Upon deleting or invalidating the sibling entry, the inline scavenging manager 162 may perform the testing operation on the file-system block 220 where that sibling entry is found. It may then perform the hole-punching operation if that block contains no valid directory entries. If there are multiple siblings, the above acts may be repeated for each one, e.g., by following the above-described circular linked list.

Figure 8:
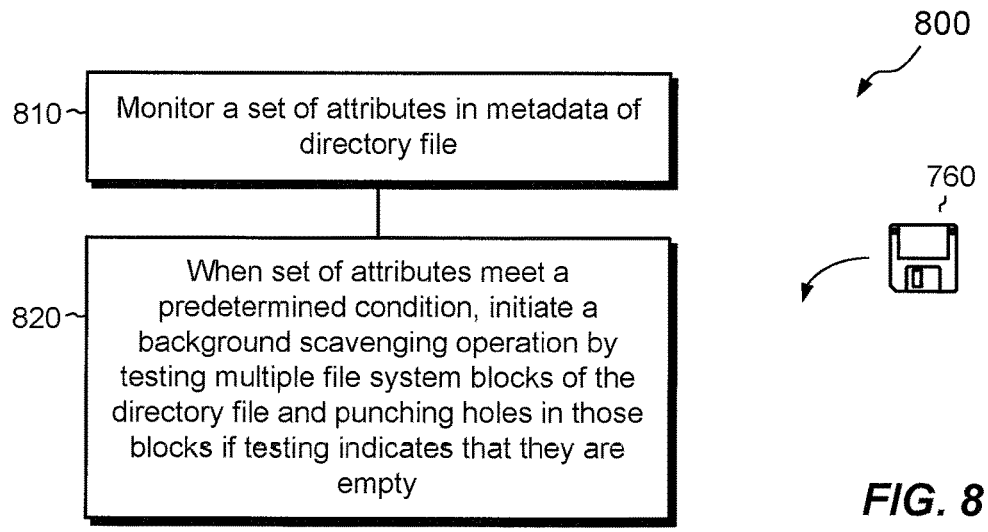
FIG. 8 is a flowchart showing an example method for performing directory scavenging in the background.

FIG. 8 shows an example method 800 for performing background directory scavenging. The method 800 may be performed, for example, by the background scavenging manager 164, which runs within the file-system manager 160 in the memory 130 of SP 120. At 810, a set of attributes in metadata of the directory file are monitored. At 820, when the set of attributes meets a predetermined condition, a background scavenging operation is initiated by testing multiple file-system blocks of the directory file and punching holes in those blocks if testing indicates that they are empty.

In an example, the set of attributes includes the File Size and/or # Dir Entries stored in inode 410 of the directory file 154. For example, the background scavenging manager 164 may initiate background scavenging in response to detecting that either of these attributes exceeds a respective threshold. In a particular example, background scavenging is initiated in response to a ratio of File Size to # Dir Entries exceeding a predetermined threshold. Background scavenging may operate over the file-system blocks 220 of the directory file 154 in whole or in part. For instance, scavenging may traverse the ordered list of block pointers of file 154 from beginning to end, testing each pointed-to file-system block and punching holes depending on results of the testing operation and, in some cases, the other criteria described above. In other examples, different threads address respective ranges of block pointers of the file 154, working effectively in parallel.

Figure 9:
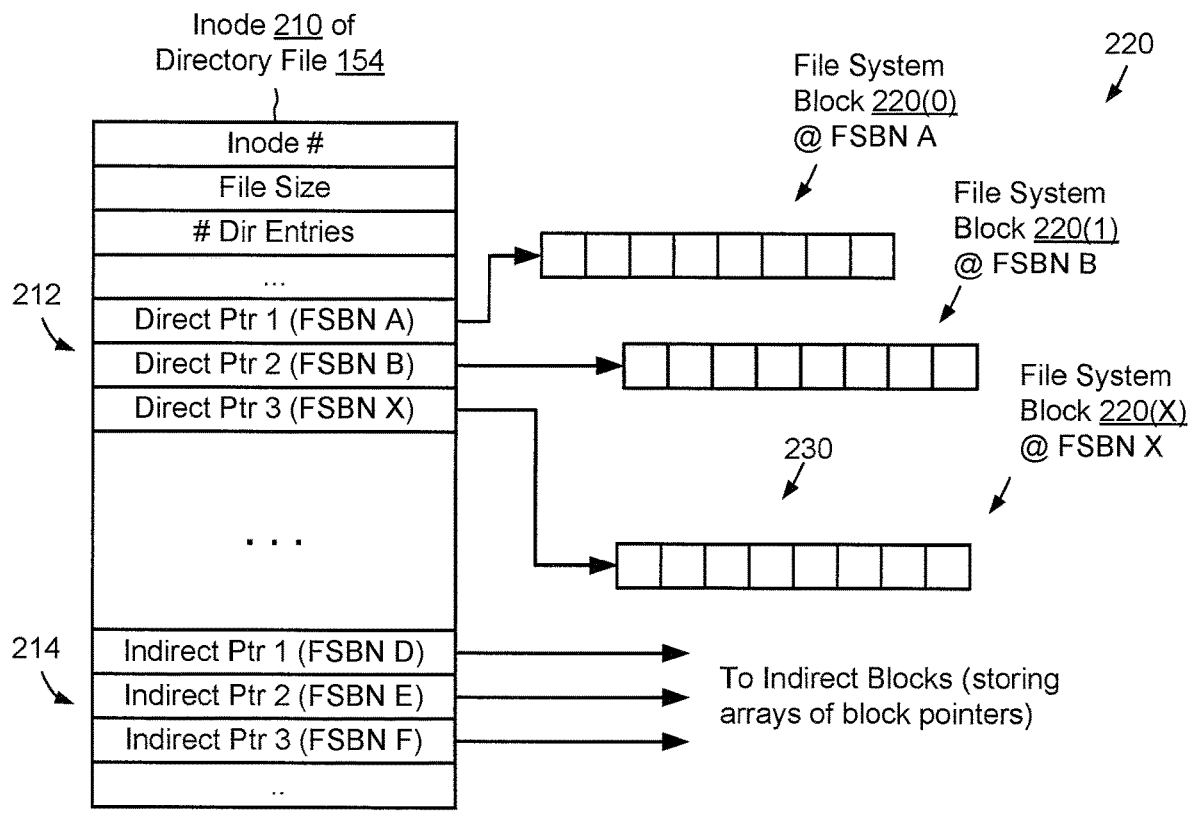
FIG. 9 is a block diagram similar to FIGS. 2 and 3 but showing the file metadata after allocating a new block at the file location where the hole in FIG. 3 was punched.

FIG. 9 shows the example arrangement of FIGS. 2 and 3 after a new file-system block 220(X) has been allocated at the punched-hole location in FIG. 3. Here, Direct Ptr 3, which initially pointed to file-system block 220(2) at FSBN C (in FIG. 2) and later was made into a hole (in FIG. 3), is now made to point to a newly allocated block 220(X) at FSBN X. The block 220(X) thus corresponds to the same logical address into the directory file 154 as did the block 220(2), but it is provided at a different physical address (FSBN X). Also, the directory elements 230 in new block 220(X) occupy the same logical positions in file 154 as did the now-deleted directory elements in formerly pointed-to block 220(2).

When performing the hole-punching operation on file-system blocks, as described in connection with FIGS. 7 and 8 above, the file-system manager 160 preferably does not access and modify hash-units that point to deleted directory elements 230. Rather, such modifications are preferably avoided as they may be resource-intensive and may provide few benefits. As a consequence of leaving the hash-units unchanged, however, the hash-units continue to store records for directory elements 230 that no longer exist. The situation may be mended, however, when new file-system blocks are allocated to fill the previously punched holes.

For example, when new file-system block 220(X) is allocated to fill the location at Direct Ptr 3, an array of dir-units may be laid down in the new file-system block 220(X) in preparation for receiving new entries. When the file-system manager 160 writes a first directory entry 520 to one of the new dir-units, it writes into its identifier 510 (FIG. 5) the hash range covered by that new dir-unit. The file-system manager 160 obtains the hash range when placing the new directory entry, as doing so requires accessing the hash-unit that stores that hash range and reading that range. At this time, the file-system manager 160 may also initialize identifiers 510 in the other new dir-units in the file-system block 220(X). As the specific hash ranges of these other dir-units are not yet known, the file-system manager 160 may write a predetermined value into the field 510 of each of these other dir-units. The file-system manager 160 may use this value as a marker, which directs the file-system manager 160 to overwrite the marked identifier 510 the next time it stores a directory entry in the respective dir-unit. In this manner, the new dir-units are made to store proper identifiers, which align with those stored in respective hash-units, and computationally expensive updates to hash-units are safely avoided.

Figure 10:
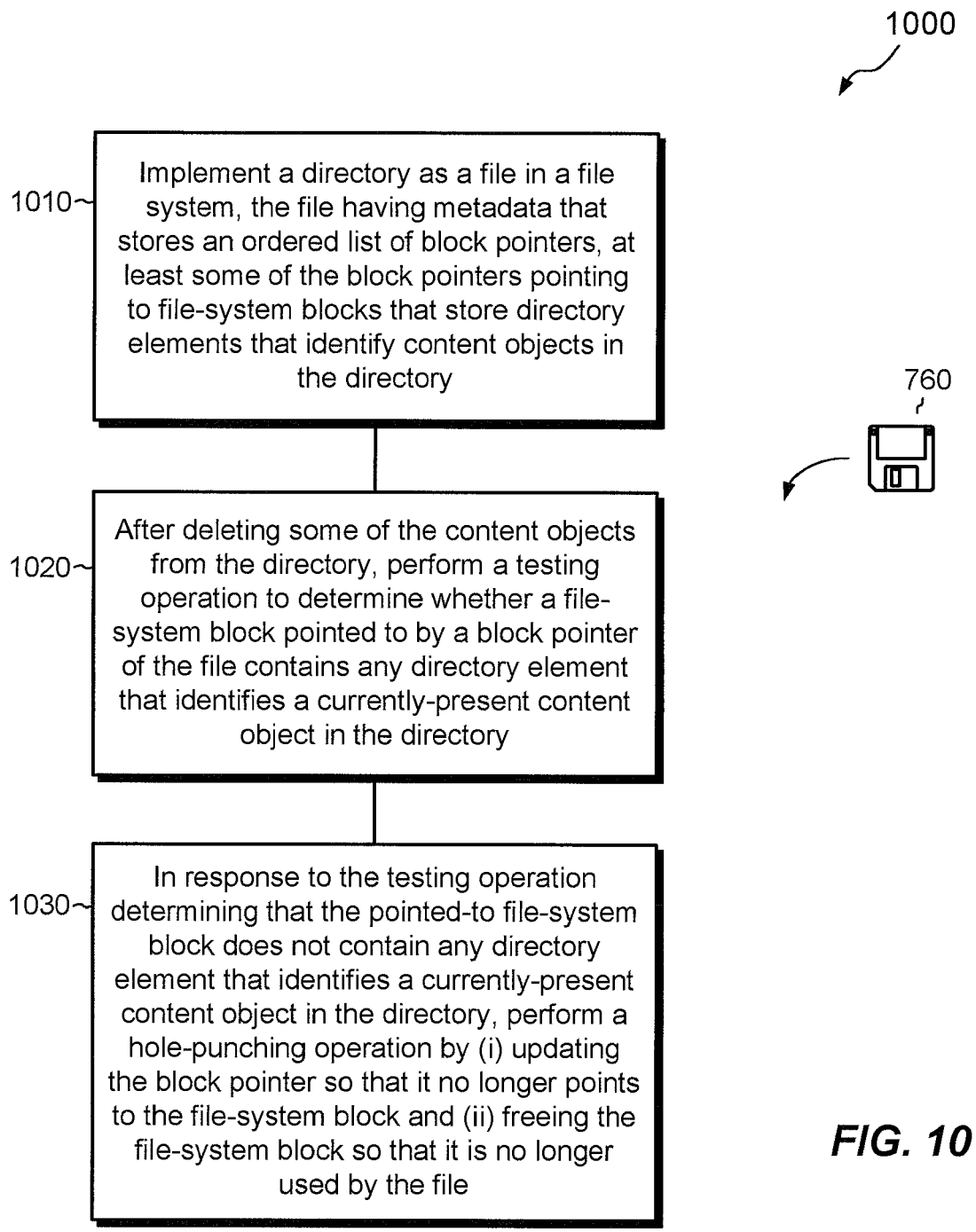
FIG. 10 is a flowchart showing an example method for managing storage of directories in a file system.

FIG. 10 shows an example method 1000 that may be carried out in connection with the environment 100. The method 1000 is typically performed, for example, by the software constructs described in connection with FIG. 1, which reside in the memory 130 of the storage processor 120 and are run by the set of processors 124. The various acts of method 1000 may be ordered in any suitable way. Accordingly, embodiments may be constructed in which acts are performed in orders different from that illustrated, which may include performing some acts simultaneously.

At 1010, a directory 400 is implemented as a file 154 in the file system 150, the file 154 having metadata (e.g., inode 210 and IBs, if necessary) that stores an ordered list of block pointers (e.g., direct pointers 212 and pointers in IBs), at least some of the block pointers pointing to file-system blocks 220 that store directory elements 230 that identify content objects (e.g., files, sub-directories, links, etc.) in the directory 400.

At 1020, after deleting some of the content objects from the directory 400, a testing operation is performed to determine whether a file-system block 220 pointed to by a block pointer of the file 154 contains any directory element 230 that identifies a currently-present content object in the directory 400. For example, all directory elements 230(0) to 230(7) in the file-system block 220(2) are individually tested to determine whether they contain any valid directory entry 520, i.e., one that has not been deleted or marked as invalid.

At 1030, in response to the testing operation determining that the pointed-to file-system block 220 does not contain any directory element 230 that identifies a currently-present content object in the directory 400, a hole-punching operation is performed by (i) updating the block pointer so that it no longer points to the file-system block 220 and (ii) freeing the file-system block so that it is no longer used by the file. For example, as shown in FIG. 3, the file-system manager 160 erases or modifies Direct Ptr 3 so that it no longer points to file-system block 220(2) at FSBN C; it also frees file-system block 220(2) so that it is no longer used by the directory file 154. The storage footprint of the directory file 154 is thus reduced. The file-system manager 160 may then allocate the block 220(2) elsewhere in the file system 150, or it may maintain it as a free block. If the block 220(2) is backed by flash storage, the flash storage may take advantage of the freed block to better organize its storage so as to prevent wear.

Having described certain embodiments, numerous alternative embodiments or variations can be made. For example, although embodiments have been described with a particular type of directory implemented as an extendable hash tree, this is merely an example, as the invention hereof may be implemented with other types of directories.

Further, although certain types of metadata are shown and/or described, such as inodes and IBs, for storing block pointers, one should appreciate that this is also merely an example, as block pointers for a file may be stored in other types of metadata.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 760 in FIGS. 7, 8, and 10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing storage of directories in a file system, the method comprising:
   implementing a directory as a file in the file system, the file having metadata that stores an ordered list of block pointers, at least some of the block pointers pointing to file-system blocks that store directory elements that identify content objects in the directory, the content objects stored elsewhere in the file system;
   after removing some of the content objects from the directory, performing a testing operation to determine whether a file-system block pointed to by a block pointer of the file contains any directory element that identifies a currently-present content object in the directory; and
   in response to the testing operation determining that the pointed-to file-system block does not contain any directory element that identifies a currently-present content object in the directory, performing a hole-punching operation by (i) updating the block pointer so that it no longer points to the file-system block and (ii) freeing the file-system block so that it is no longer used by the file,
   wherein at least some of the directory elements store directory entries, each directory entry providing information about a respective content object in the directory, and wherein the method further comprises:
   receiving a request to remove a content object from the directory; and
   in response to receiving the request,
      (i) identifying a directory entry that provides information about the content object to be removed, that directory entry stored in a particular directory element of the directory, the particular directory element stored in a particular file-system block pointed to by the list of block pointers, the particular file-system block including multiple directory elements;
      (ii) deleting or markinq as invalid the directory entry;
      (iii) performing the testing operation on the particular file-system block; and
      (iv) in response to the testing operation indicating that the particular file-system block does not contain any directory element that identifies a currently-present content object in the directory, performing the hole-punching operation on the particular file-system block,
   wherein the directory entry for the content object to be removed has a record length, and wherein deleting or marking as invalid the directory entry includes:
      setting an attribute in the directory entry to a value that indicates that the directory entry is invalid; and
      updating a record length of another directory entry that precedes the directory entry in the same directory element, such that the record length of the other directory entry is set to a sum of the record lengths of both directory entries.

2. The method of claim 1, wherein each of a plurality of the file-system blocks pointed-to by the block pointers of the file stores multiple directory elements.

3. The method of claim 2, further comprising repeating the testing operation and the hole-punching operation for multiple file-system blocks pointed to by the list of block pointers of the file, as part of a background scavenging operation.

4. The method of claim 3, wherein the metadata of the file includes a set of attributes of the file, and wherein the background scavenging operation is initiated in response to monitoring the set of attributes and detecting that the set of attributes satisfies a predetermined condition.

5. The method of claim 4, wherein the set of attributes includes a first attribute that indicates a file size of the file and a second attribute that indicates a number of directory entries in the file, and wherein the predetermined condition is satisfied when a ratio of the first attribute to the second attribute exceeds a predetermined threshold.

6. The method of claim 2,
wherein directory elements are provided in the form of dir-units and hash-units,
wherein each of the dir-units is configured to store a set of directory entries, each of the directory entries providing a name of a content object and a corresponding inode number of that content object in the file system, the directory storing directory entries for content objects in dir-units according to hash values of names of those content objects, and
wherein each of the hash-units is configured to store records that associate positions of other directory elements with respective ranges of hash values.

7. The method of claim 6, further comprising:
receiving a request to add a new content object to the directory;
allocating a new file-system block for storing a new directory entry for the new content object;
writing a file-system address of the new file-system block in the block pointer which had previously been made into a hole;
providing multiple new dir-units in the new file-system block;
storing the new directory entry in one of the new dir-units along with an identifier of a range of hash values covered by that new dir-unit; and
writing a marker to each of the other new dir-units to indicate that the range of hash values covered by each of the other new dir-units is not yet known,
wherein a hash-unit in the directory already stores a record of each of the new dir-units, the record having been created prior to performing the hole-punching operation.

8. The method of claim 7, further comprising writing a new directory entry to one of the other new dir-units and replacing the marker with an identifier of the range of hash values covered by that one of the other new dir-units.

9. The method of claim 1,
wherein performing the testing operation on the particular file-system block includes testing whether any of the directory elements stored in the particular file-system block contains a directory entry that identifies a currently-present content object in the directory, and
wherein the hole-punching operation on the particular file-system block is performed in response to the testing operation indicating that none of the directory elements stored in the particular file-system block contains any directory entry that identifies a currently-present content object in the directory.

10. The method of claim 9,
wherein a content object in the directory has a set of alternative names, each alternative name stored in a respective other file-system block pointed to by the list of block pointers, and
wherein the method further comprises performing the testing operation on each of the other file-system blocks to determine whether that other file-system block contains any directory element that identifies a currently-present content object in the directory and, if not, performing the hole-punching operation on the respective other file-system block.

11. The method of claim 1, wherein performing the testing operation on the particular file-system block further includes, for each directory element stored in the particular file-system block, testing (i) whether a first directory entry in the respective directory element has a record length equal to a length of the directory element as a whole and (ii) whether the first directory entry stores an attribute having a value that indicates that the directory entry is invalid.

12. A data storage system, comprising control circuitry that includes a set of processing units coupled to memory, the control circuitry constructed and arranged to:
implement a directory as a file in the file system, the file having metadata that stores an ordered list of block pointers, at least some of the block pointers pointing to file-system blocks that store directory elements that identify content objects in the directory;
after removal of some of the content objects from the directory, perform a testing operation to determine whether a file-system block pointed to by a block pointer of the file contains any directory element that identifies a currently-present content object in the directory; and
in response to the testing operation determining that the pointed-to file-system block does not contain any directory element that identifies a currently-present content object in the directory, perform a hole-punching operation by (i) updating the block pointer so that it no longer points to the file-system block and (ii) freeing the file-system block so that it is no longer used by the file,
wherein at least some of the directory elements store directory entries, each directory entry providing information about a respective content object in the directory, and wherein the control circuitry is further constructed and arranged to:
receive a request to remove a content object from the directory; and
in response to receipt of the request,
(i) identify a directory entry that provides information about the content object to be removed, that directory entry stored in a particular directory element of the directory, the particular directory element stored in a particular file-system block pointed to by the list of block pointers, the particular file-system block including multiple directory elements;
(ii) delete or mark as invalid the directory entry;
(iii) perform the testing operation on the particular file-system block; and
(iv) in response to the testing operation indicating that the particular file-system block does not contain any directory element that identifies a currently-present content object in the directory, perform the hole-punching operation on the particular file-system block,
wherein the directory entry for the content object to be removed has a record length, and wherein the control circuitry constructed and arranged to delete or mark as invalid the directory entry is further constructed and arranged to:
set an attribute in the directory entry to a value that indicates that the directory entry is invalid; and
update a record length of another directory entry that precedes the directory entry in the same directory element, such that the record length of the other directory entry is set to a sum of the record lengths of both directory entries.

13. A computer program product including a set of non-transitory, computer-readable media having instructions which, when executed by control circuitry of a data storage system, cause the control circuitry to perform a method for managing storage of directories in a file system, the method comprising:

implementing a directory as a file in the file system, the file having metadata that stores an ordered list of block pointers, at least some of the block pointers pointing to file-system blocks that store directory elements that identify content objects in the directory;

after removing some of the content objects from the directory, performing a testing operation to determine whether a file-system block pointed to by a block pointer of the file contains any directory element that identifies a currently-present content object in the directory; and in response to the testing operation determining that the pointed-to file-system block does not contain any directory element that identifies a currently-present content object in the directory, performing a hole-punching operation by (i) updating the block pointer so that it no longer points to the file-system block and (ii) freeing the file-system block so that it is no longer used by the file, wherein at least some of the directory elements store directory entries, each directory entry providing information about a respective content object in the directory, and wherein the method further comprises:

receiving a request to remove a content object from the directory; and in response to receiving the request,
(i) identifying a directory entry that provides information about the content object to be removed, that directory entry stored in a particular directory element of the directory, the particular directory element stored in a particular file-system block pointed to by the list of block pointers, the particular file-system block including multiple directory elements;
(ii) deleting or marking as invalid the directory entry;
(iii) performing the testing operation on the particular file-system block; and
(iv) in response to the testing operation indicating that the particular file-system block does not contain any directory element that identifies a currently-present content object in the directory, performing the hole-punching operation on the particular file-system block, wherein the directory entry for the content object to be removed has a record length, and wherein deleting or markinq as invalid the directory entry includes:
setting an attribute in the directory entry to a value that indicates that the directory entry is invalid; and
updating a record length of another directory entry that precedes the directory entry in the same directory element, such that the record length of the other directory entry is set to a sum of the record lengths of both directory entries.

14. The computer program product of claim 13, wherein each of a plurality of the file-system blocks pointed-to by the block pointers of the file stores multiple directory elements.

15. The computer program product of claim 14,
wherein a content object in the directory has a set of alternative names, each alternative name stored in a respective other file-system block pointed to by the list of block pointers, and
wherein the method further comprises performing the testing operation on each of the other file-system blocks to determine whether that other file-system block contains any directory element that identifies a currently-present content object in the directory and, if not, performing the hole-punching operation on the respective other file-system block.

16. The computer program product of claim 14, wherein the method further comprises repeating the testing operation and the hole-punching operation for multiple file-system blocks pointed to by the list of block pointers of the file, as part of a background scavenging operation.

17. The computer program product of claim 16, wherein the metadata of the file includes a set of attributes of the file, and wherein the background scavenging operation is initiated in response to monitoring the set of attributes and detecting that the set of attributes satisfies a predetermined condition.

\* \* \* \* \*